United States Patent [19]

Puschkarski

[11] Patent Number: 4,821,382

[45] Date of Patent: Apr. 18, 1989

[54] FASTENING ELEMENT FOR THE CONNECTION TOGETHER OF TWO SHEET MEMBERS

[76] Inventor: Theodor Puschkarski, Auhofstrasse 170, A-1130 Wien, Austria

[21] Appl. No.: 174,946

[22] Filed: Mar. 29, 1988

[51] Int. Cl.⁴ .................................................. A44B 21/00
[52] U.S. Cl. ........................................... 24/298; 24/339
[58] Field of Search ............... 24/298, 300, 336, 339, 24/329, 371, 17 B, 17 AP, 33 R; 403/93, 97; 285/24, 27

[56] References Cited

U.S. PATENT DOCUMENTS

| | | | |
|---|---|---|---|
| 1,880,269 | 10/1932 | Murray | 285/27 |
| 2,452,406 | 10/1948 | Volkery et al. | 24/329 |
| 2,942,314 | 6/1960 | Debner et al. | 24/339 |
| 3,033,412 | 5/1962 | Fox | 24/339 |
| 3,206,086 | 9/1965 | Duffney | 24/339 |
| 3,669,491 | 6/1972 | Weslock | 24/339 |
| 3,890,694 | 6/1975 | Pineur | 285/27 |
| 3,916,089 | 10/1975 | Sloan | 24/339 |
| 4,663,807 | 5/1987 | Bozzo | 24/30.5 P |
| 4,707,892 | 11/1987 | Nelson | 24/336 |

FOREIGN PATENT DOCUMENTS 1933378 4/1970 Fed. Rep. of Germany ........ 24/298

Primary Examiner—Victor N. Sakran
Attorney, Agent, or Firm—Dennis P. Clarke

[57] ABSTRACT

The present invention relates a fastening element for the connection of two sheets or plates (herein termed sheets) arranged at a selectable angle in relation to each other along their abutting edges using two gripping jaws able to be centrally connected with each other by means of a screw, said jaws having wings of different length and forming two bearing sockets, in each of which there are rotatable cylindrical gripping rollers provided with an axial gripping groove and consisting of elastic material.

The purpose of the invention is to provide an improved form of such a fastening element remedying the defects of known devices and making it possible to set sheets at a predetermined included angle in a single manner. In this respect it should be possible for the gripping rollers to be slipped onto the sheets easily in the non-screwed tight condition and to prevent the gripping rollers from falling out during assembly. Furthermore the device should be suitable for the connection together of elements with other cross sectional forms such as tubes or tapped sleeves.

In order to achieve these or other objects of the invention of the inner side of the long wing of the gripping jaw half forming the bearing socket a single axially extending rib is formed, which is able to be engaged selectively with one of a number of locking grooves arranged at suitable distances from each other, the two gripping rollers each being connected by means of a flexible connecting lug to form a unit.

9 Claims, 5 Drawing Sheets

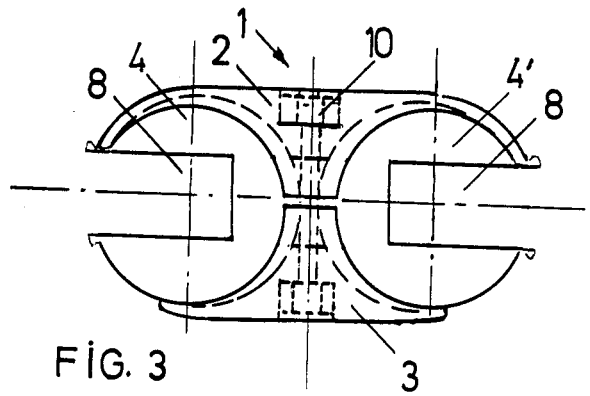
FIG. 3
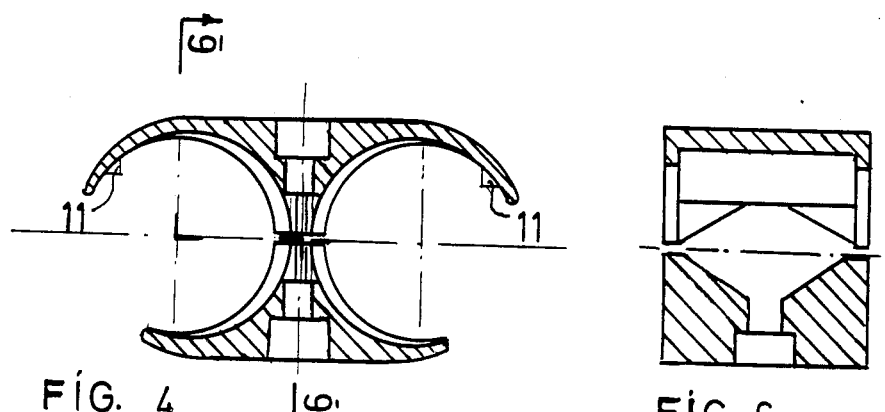
FIG. 4
FIG. 6
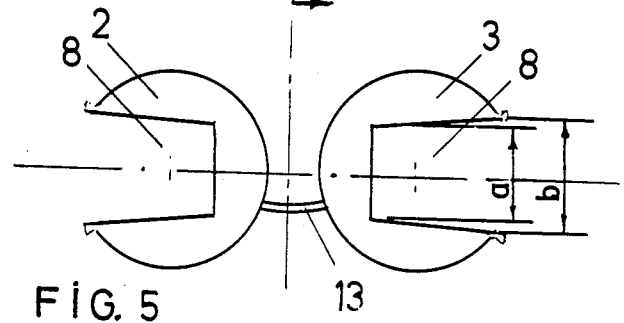
FIG. 5

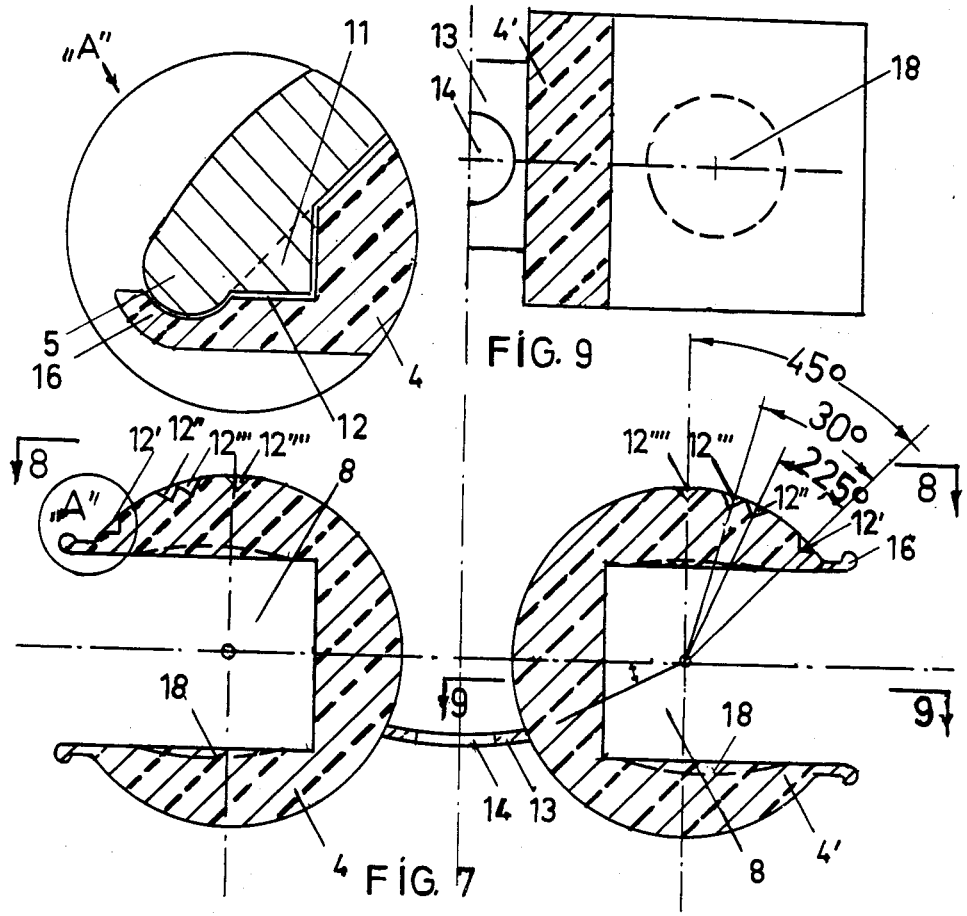
FIG. 9
FIG. 7
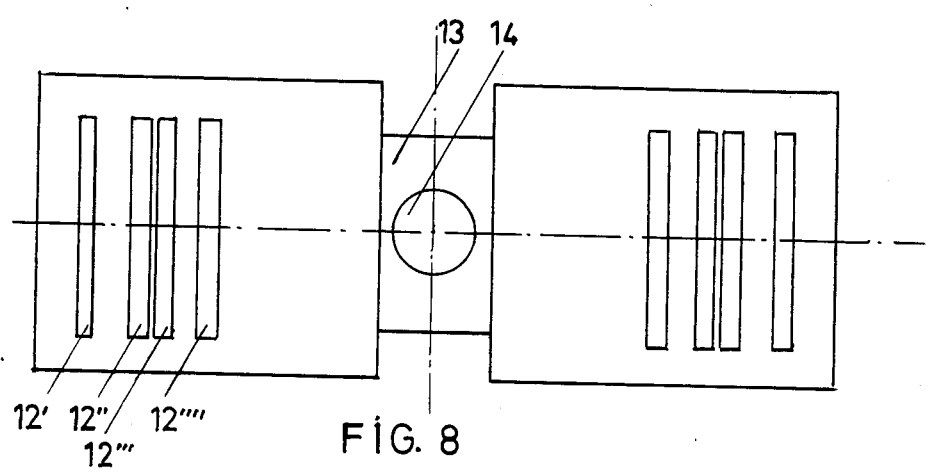
FIG. 8

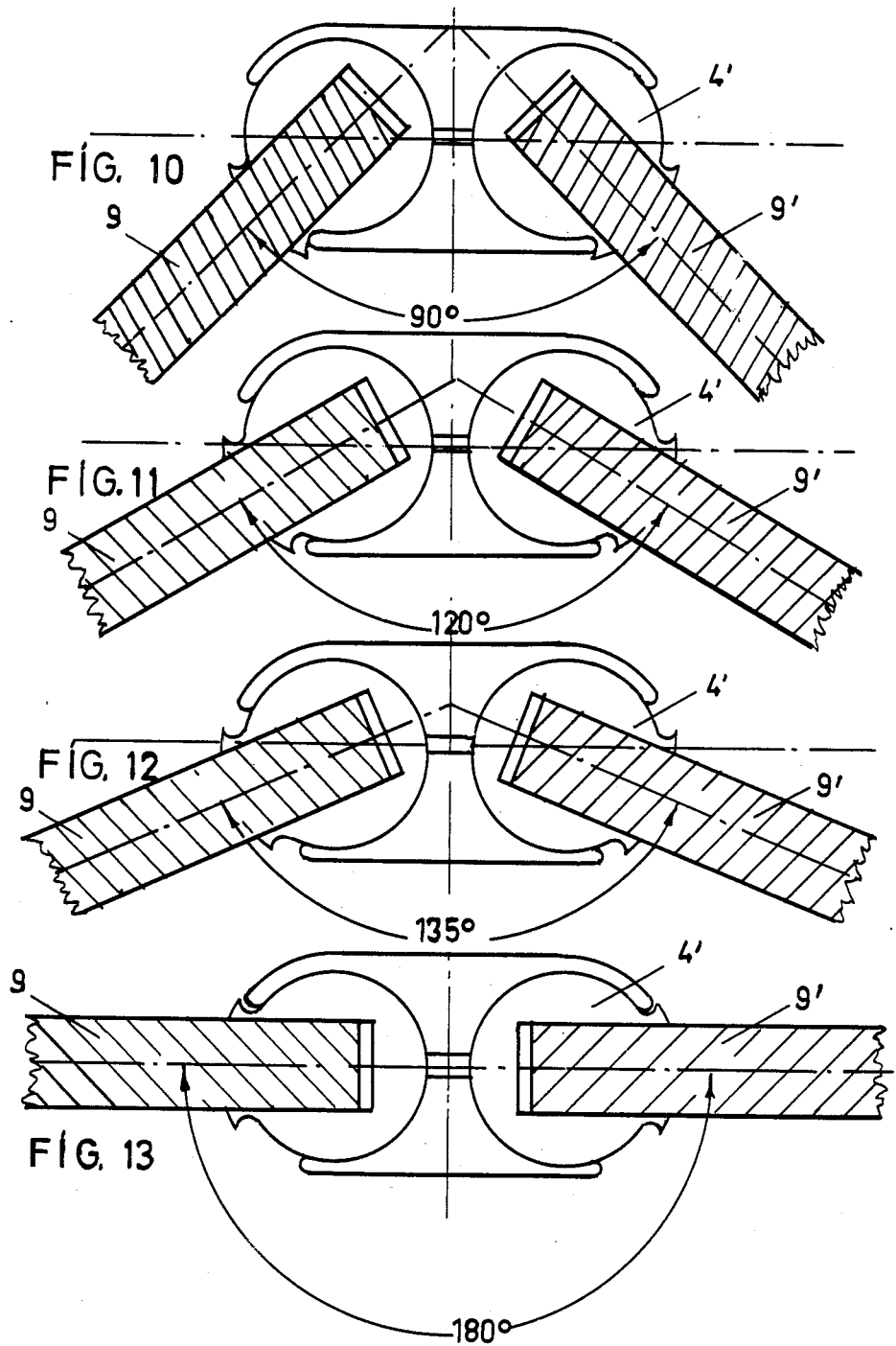

FASTENING ELEMENT FOR THE CONNECTION TOGETHER OF TWO SHEET MEMBERS

BACKGROUND OF THE INVENTION

The present invention relates a fastening element for the connection of two sheets or plates (herein termed sheets) arranged at a selectable angle in relation to each other along their abutting edges using two gripping jaws able to be centrally connected with each other by means of a screw, said jaws having wings of different length and forming two bearing sockets, in each of which there is rotatable cylindrical gripping rollers provided with an axial gripping groove and consisting of elastic material.

Such a fastening element for the connection of sheets placed adjacent to each other at selectable angles along their abutting edges with joint parts of elastic material has already been proposed in the German Pat. No. 1,933,378, in the case of which the joint parts have two separate gripping rollers each provided with an axial gripping groove and having a circular cylindrical form, such rollers being borne in two gripping jaw halves able to be connected together by means of a screw and forming bearing sockets in such a manner that the same are able to be freely turned into the condition in which they are not screwed together.

However such a known arrangement has the disadvantage that it is difficult to set the sheets at the desired angle to each other, since it is hard to align the sheets during assembly prior to screwing tight the screw with the gripping rollers only loosely mounted in the bearing sockets of the gripping jaws in which the rollers are able to freely turn. If for instance the sheets are boards to be erected as part of an exhibition booth so as to comply with a specific geometry, as for instance a polygon, it is only possible for the configuration to be achieved exactly if the included angle between two adjacent sheet is so exactly set that it complies with the desired geometrical configuration to be produced.

In this respect it is a disadvantage as well that the gripping groove in the gripping rollers has a form of cross section which is rectangular and tapers towards the open end since this means that this gripping groove in the gripping rollers is hard to open out for assembly on the sheets in order to attach the gripping rollers on the sheets, since the assembly operator would have to then have both hands free and this would mean that he would not be able to work quickly enough.

A further disadvantage is that each of the gripping rollers separately mounted in each of the bearing sockets are quite likely to drop out of the bearing sockets and be lost during assembly of the fastening element, so that the assembly of the element is impeded.

A further disadvantage is that if the gripping effect of the rollers should slacken off somewhat the sheets are no longer held fast in the fastening element and may come out of the fastening element.

A still further shortcoming in this known arrangement with gripping rollers in the known system is that it is only possible to connect sheet-like members together and parts with a different cross section are not able to be connected.

SHORT SUMMARY OF THE INVENTION

One object of the present invention is to provide an improved fastening or connecting element for the connection together of two sheets with a selectable angle between them along the abutting edges of the sheets.

A still further purpose of the invention is to assure a preset included angle of the grooves in the gripping rollers holding the sheets even prior to tightening the screw means for assembly at the desired angular setting.

A still further aim of the invention is to so configure the fastening element that the assembling user of the system may readily fit the element to the sheets using only hand only.

A further objective of the invention is to prevent the gripping rollers from dropping out of the bearing sockets and being lost.

Furthermore, after loosening the screw clamping means the gripping rollers should adhere to the sheets for some time.

The novel fastening element is furthermore to be so designed that it may be used with other forms of cross section than sheets, as for example tubes or screw sleeves.

In order to achieve these or other objects of the invention appearing herein on the inner side of the long wing of the gripping jaw half forming the bearing socket a single axially extending rib is formed, which is able to be engaged selectively with one of a number of locking grooves arranged at suitable distances from each other in the gripping rollers, the two gripping rollers each being connected by means of a flexible connecting lug to form a unit.

Further features of the invention are indicated in the claims.

Working embodiments of the invention will now be described with reference to the figures.

LIST OF THE SEVERAL VIEWS OF THE DRAWINGS

FIG. 3 shows the fastening element with the gripping rollers in the screwed-together condition from the side.

FIG. 4 shows the two gripping jaw halves mounted on each other, the gripping rollers not being shown, from the side.

FIG. 5 shows the gripping rollers from the side in a separate view.

FIG. 6 is a section taken on the line 6—6 of FIG. 4.

FIG. 7 shows the gripping rollers on a larger scale with locking grooves arranged in the outer face, "A" denoting a part-view as in figure 7.

FIG. 8 is a plan view on the line 8—8 of figure 7.

FIG. 9 is a section taken on the line 9—9 of FIG. 7.

FIG. 10 is a section through two sheets connected together with an included angle of 9° using the fastening element.

FIG. 11 is a section taken through two sheets connected together by the fastening element with an included angle of 120°.

FIG. 12 is a section taken through two sheets connected together by means of the fastening element so as to have an angle of 135° between them.

FIG. 13 is a section through two sheets connected together by the fastening element so as to have an angle of 180° between them.

DETAILED ACCOUNT OF WORKING EMBODIMENTS OF THE INVENTION

Figure 2:
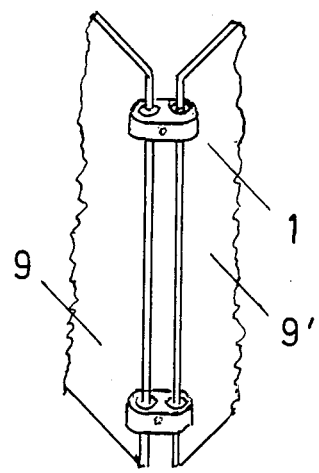
FIG. 2 shows two sheets in perspective as connected together with two fastening elements.
Figures 14, 15:
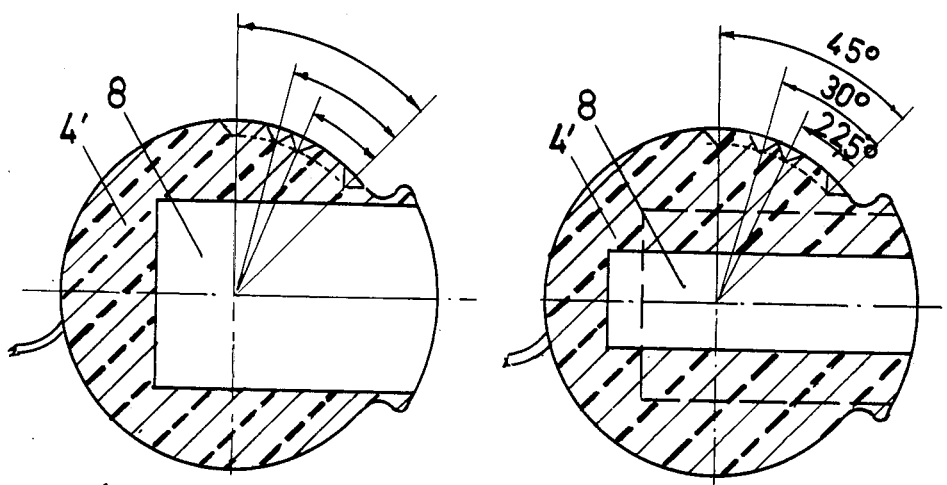
FIG. 14 is a section through a gripping roller on a larger scale which has been designed for a greater sheet thickness.
FIG. 15 is a section through a gripping roller designed for a lesser sheet thickness, on a larger scale.
Figures 16, 17:
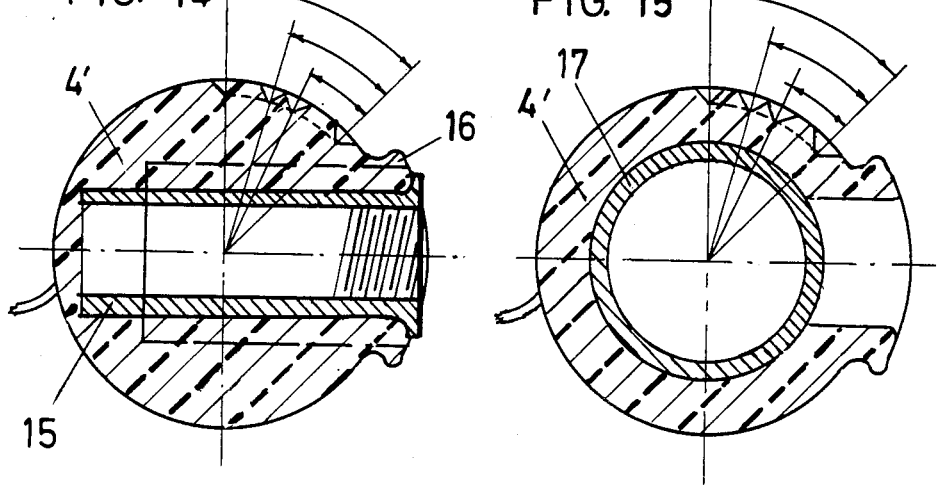
FIG. 16 is a section taken through a gripping roller which has a sleeve provided with an internal screw thread.
FIG. 17 is a section through a gripping roller which is used for gripping a tube.

As may be seen from FIG. 2 two sheets 9 and 9' or boards are connected together along their abutting edge by means of two fastening elements 1, it being possible to set the sheets 9 and 9' so as to have a given included angle between them.

Figure 1:
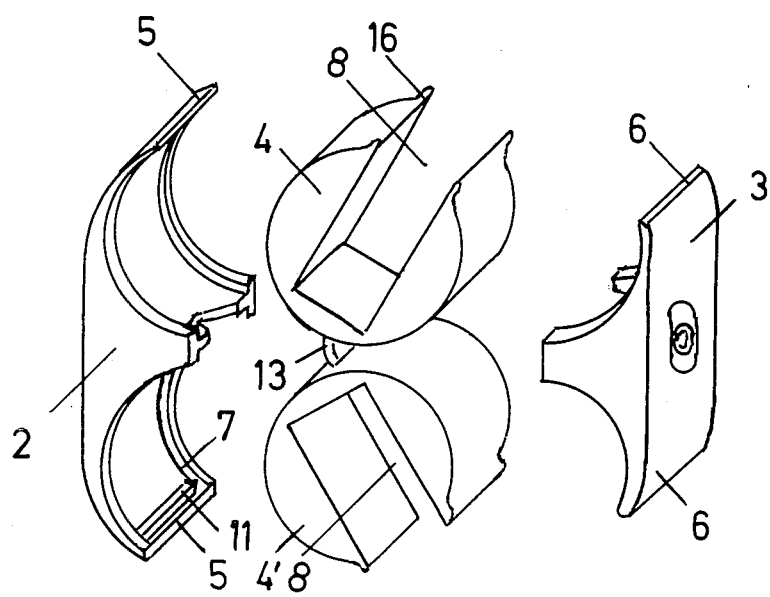
FIG. 1 shows the fastening element in accordance with the invention with a separate view of the gripping jaws and the gripping rollers in perspective.

As will be seen from FIG. 1 the individual fastening elements 1 consist of two gripping jaw halves 2 and 3 of a rigid material which are centrally connected together by means of a screw 10 and form bearing sockets, and of two gripping rollers 4 and 4' of elastic material placed between the said halves and each provided with a gripping groove 8. These gripping grooves 8 of the gripping rollers 4 and 4' accept two sheets 9 and 9' to be joined together with a certain included angle between them; after the insertion of the sheets into the grooves the gripping jaw halves 2 and 3 are pressed by means of the screw 10, the two gripping rollers 4 and 4' consisting of elastic material being pressed against each other so that the plates 9 and 9' are firmly located and are also so firmly gripped in the axial direction that there is no chance of their slipping out of the groove 8, something that is also prevented by the radial flash 7 on the gripping jaw halves. It is not possible for the gripping jaw halves 2 and 3 to be squeezed out of the bearing sockets either because, as will be seen from FIGS. 1 and 3, the one gripping jaw half 2 has wings 5 and its ends are made longer than the wings 6 on the other gripping jaw half 3, the length of these wings being made such that there is minimum included angle between the sheets equal to 90° or there is maximum included angle of 180°, this being achieved inasfar as the longer wings 5 of the gripping jaw half 2 are so long that in the case of an included angle 180° between the sheets the wing ends almost laterally touch the sheets and the short wings of the other gripping jaw half 3 are in each case only made sufficiently long for their ends almost to touch the sheets of the other side in the case of an included angle between the plates of 90°.

In order to prevent the gripping rollers 4 and 4' from dropping out and being lost before the fastening element is screwed together, the two gripping rollers 4 and 4' in the sockets of the gripping jaw halves 2 and 3 of each fastening element are connected together by means of a flexible connecting lug 13, the same having a central circular recess 14 for the passage of the screw 10.

As will be seen from the part-view "A" of FIG. 7, there is a locking rib 11 mounted on the internal surface of the long wing 5 of the gripping jaw half 2 so as to extend in the axial direction, such rib being able to be brought into engagement with one of a number of locking grooves 12',12'',12''' and 12'''' and arranged on the cylindrical outer face of the gripping rollers 4 and 4' so as to extend in the axial direction. The first locking groove 12 is in this respect placed near an abutment head 16 extending along the gripping groove 8, such head cooperating with the end of the long wing 5 of the gripping jaw half 2 and thereby serving as an abutment for the gripping rollers 4 and 4'. The gripping rollers 4 and 4' are turned so far that that the locking rib 11 snaps into the locking groove corresponding to the selected angle of the sheets. Neither the locking rib 11 arranged on the wing 5 of the gripping jaw half 2 nor the locking grooves 12', 12'', 12''' and 12'''' arranged at the external surface of the gripping rollers 4 and 4' extend, as will be apparent from FIG. 8, extend along the full breadth of the gripping rollers 4 and 4'. The locking grooves are arranged with such a spacing between them that the sheets to be connected with each other may have a selected angle between them of, for instance, 180°, 135°, 120° or 90°.

The locking grooves 12' are arranged on the external surface of the gripping rollers 4 and 4' adjacent to the gripping groove 8. If the sheets to be connected are to be erected to form a straight wall or a hexagon or an octagon, the second locking groove 12'' is placed with central angle from the first locking groove 12'' of 22.5° and the third locking groove 12''' is placed with an angular spacing from the first locking groove 12' equal to 30° as a central angle and the fourth locking groove 12'' is arranged with a center angle of 45° from the first locking groove 12' (see FIG. 7).

Once the locking rib 11 has been fitted into the desired locking groove prior to screwing the assembly together, the arrangement still ensures that the sheets connected together have exactly the desired included angle between them, this making it possible to join the sheets together to form a perfectly regular polygon or a precisely flat wall.

The gripping grooves 8 arranged in the gripping rollers 4 and 4' are so shaped that they have a trapezoid-like cross section, whose breadth "b" widens towards the open side to be somewhat greater than the thickness "a" of the sheets to be fastened in order to make it possible for the gripping rollers to be easily slipped onto the sheets to be fastened even before screwing up and single-handedly (see FIG. 5).

The gripping rollers 4 and 4' are preferably made of injection molded, thermoplastic rubber on a polyester basis which has a certain tendency to shrinkage so that at parts where the material of the gripping rollers is particularly thick in the gripping rollers 4 and 4' there are shallow concavities 18 due to shrinkage, see more especially the inner surfaces of the gripping grooves 8. Such concavities ensure that after screwing tight a vacuum is formed them which leads to a holding force so that they firmly adhere to the sheets to be fastened together, the gripping rollers being able to be readily detached by when the fasteners are detached from the sheets.

One of the gripping rollers 4' may be provided with a gripping groove with a cylindrical cross section for the connection together of tubular parts 17.

A tapped sleeve 15 may be formed in one of the gripping rollers 4' for a screw to be screwed into so that differently shaped members may be connected with the fastener or vertically adjustable feet may be screwed into them.

I claim:

1. A fastening element for the connection together of two sheets at a selectable angle in relation to each other along an abutting edge, comprising gripping jaws formed with wings of different length, a screw to connect such jaws with each other, such jaws forming bearing sockets, rotatable cylindrical gripping rollers mounted in such sockets, said gripping rollers being made of elastic material and each having an axial gripping groove, said gripping jaws including a gripping jaw half forming such socket and having a longer wing with an inner surface with an axially extending locking rib formed thereon, a plurality of differently spaced locking grooves arranged at the peripheral surface of the gripping rollers, such ribs being able to be selectively engaged in one of said plurality of differently spaced locking grooves, the two gripping rollers each being united by means of a flexible connecting lug with each other.

2. The fastening element as claimed in claim 1 wherein such locking grooves include a first groove adjacent to said gripping groove and spaced from a second one of such grooves by a central angel of 22.5°.

3. The fastening element as claimed in claim 1 wherein a third one of such locking grooves is spaced from the first said groove by a central angle of 30° and a fourth one of such grooves is spaced from the first groove by a central angel of 45°.

4. The fastening element as claimed in claim 1 wherein the gripping grooves of the gripping rollers have a trapezoid-like cross section widening to the open side.

5. The fastening element as claimed in claim 1 wherein the gripping rollers are manufactured of synthetic rubber.

6. The fastening element as claimed in claim 1 wherein the material for the gripping rollers is an injection molded one having a tendency to shrinkage and forming concavities at surfaces of the gripping rollers engaging the sheets in order to provide for vacuum adhesion on the sheets at such concavities.

7. The fastening element as claimed in claim 1 wherein the gripping groove of one of such gripping rollers has a form adapted to grip a tube.

8. The fastening element as claimed in claim 1 wherein the gripping groove of one of the gripping rollers has a form adapted to grip a sleeve with a screw thread therein.

9. A fastening element for the connection together of two sheets at a selectable angle in relation to each other along an abutting edge, comprising gripping jaws formed with wings of different length, a screw to connect such jaws with each other, such jaws forming bearing sockets, rotatable cylindrical gripping rollers mounted in such sockets, said gripping rollers being made of elastic material and each having an axial gripping groove, said gripping jaws including a gripping jaw half forming such socket and having a longer wing with an inner surface with an axially extending locking rib formed thereon, a plurality of differently spaced locking grooves arranged at the peripheral surface of the gripping rollers, such ribs being able to be selectively engaged in one of said plurality of differently spaced locking grooves.

* * * * *

UNITED STATES PATENT AND TRADEMARK OFFICE
CERTIFICATE OF CORRECTION

PATENT NO.   :   4,821,382
DATED        :   April 18, 1989
INVENTOR(S)  :   Theodor Puschkarski It is certified that error appears in the above-identified patent and that said Letters Patent is hereby corrected as shown below:

Claim 2, line 19, "angel" should read --angle--.

Claim 3, line 23, "angel" should read --angle--.

Signed and Sealed this

Fourteenth Day of November, 1989

*Attest:*

JEFFREY M. SAMUELS

*Attesting Officer*     *Acting Commissioner of Patents and Trademarks*